US012665332B2

(12) United States Patent
Li et al.

(10) Patent No.: US 12,665,332 B2
(45) Date of Patent: Jun. 23, 2026

(54) GOLD FINGER DESIGN FOR DIFFERENTIAL EDGE CARDS

(71) Applicant: Intel Corporation, Santa Clara, CA (US)

(72) Inventors: Xiang Li, Portland, OR (US); Howard Heck, Tigard, OR (US); Jingbo Li, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 119 days.

(21) Appl. No.: 17/855,077

(22) Filed: Jun. 30, 2022

(65) Prior Publication Data

US 2022/0336986 A1 Oct. 20, 2022

(51) Int. Cl.
*H01R 13/03* (2006.01)
*H01R 12/72* (2011.01)
*H01R 13/11* (2006.01)

(52) U.S. Cl.
CPC ........... *H01R 13/03* (2013.01); *H01R 12/721* (2013.01); *H01R 13/11* (2013.01)

(58) Field of Classification Search
CPC ...... H01R 13/03; H01R 12/57; H01R 12/721; H01R 13/02–187; H01R 12/55–585
USPC ........................................................ 439/108
See application file for complete search history.

(56) References Cited

U.S. PATENT DOCUMENTS

| | | | | |
|---|---|---|---|---|
| 6,796,822 B2 * | 9/2004 | Sato | H01R 12/721 439/632 |
| 2014/0357105 A1 * | 12/2014 | Wig | H05K 1/0216 29/832 |
| 2021/0091493 A1 * | 3/2021 | Yin | H01R 13/62966 |
| 2021/0313744 A1 * | 10/2021 | Li | H05K 1/0216 |
| 2021/0367363 A1 * | 11/2021 | Wu | G06F 30/39 |
| 2023/0032371 A1 * | 2/2023 | Farkas | H05K 1/117 |

* cited by examiner

*Primary Examiner* — Abdullah A Riyami
*Assistant Examiner* — Amara Anderson
(74) *Attorney, Agent, or Firm* — NICHOLSON DE VOS WEBSTER & ELLIOTT LLP

(57) ABSTRACT

Methods and apparatus relating to a gold finger design for differential edge cards are described. In one embodiment, a signal finger comprises a first portion to communicate electrical signals between a signal pin of a card connector and a card; and a second portion to provide a mechanical wiping surface for the signal pin. Other embodiments are also claimed and disclosed.

18 Claims, 8 Drawing Sheets

GOLD FINGER DESIGN FOR DIFFERENTIAL EDGE CARDS

FIELD

The present disclosure generally relates to the field of electronics. More particularly, an embodiment relates to a gold finger design for differential edge cards.

BACKGROUND

Card edge connectors are widely used in high speed Input/Output (I/O) applications, such as Peripheral Component Interconnect express (PCIe) devices. The connector performance can significantly impact the I/O channel performance.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware (such as logic circuitry or more generally circuitry or circuit), software, firmware, or some combination thereof.

As mentioned above, the connector performance can significantly impact the I/O channel performance. To this end, some embodiments relate to a gold finger design for differential edge cards. As discussed herein, a "gold finger" generally refers to a conductive metal that has been gold-plated for improved electrical conductivity and/or mechanical longevity in situations where two metal contacts are removably coupled. In one embodiment, a signal finger comprises a first portion to communicate electrical signals between a signal pin of a card connector and a card; and a second portion to provide a mechanical wiping surface for the signal pin.

Further, one or more embodiments enhance performance beyond 16 Giga Hertz (GHz) and are capable supporting high speed I/O links beyond 100 giga bits per second (Gbps), e.g., with Pulse Amplitude Modulation 4-level (PAM4) signaling, where the component design has been challenging. As discussed herein, "PAM4" signaling generally refers to a multilevel signal modulation format used to transmit signals.

Figure 1A:
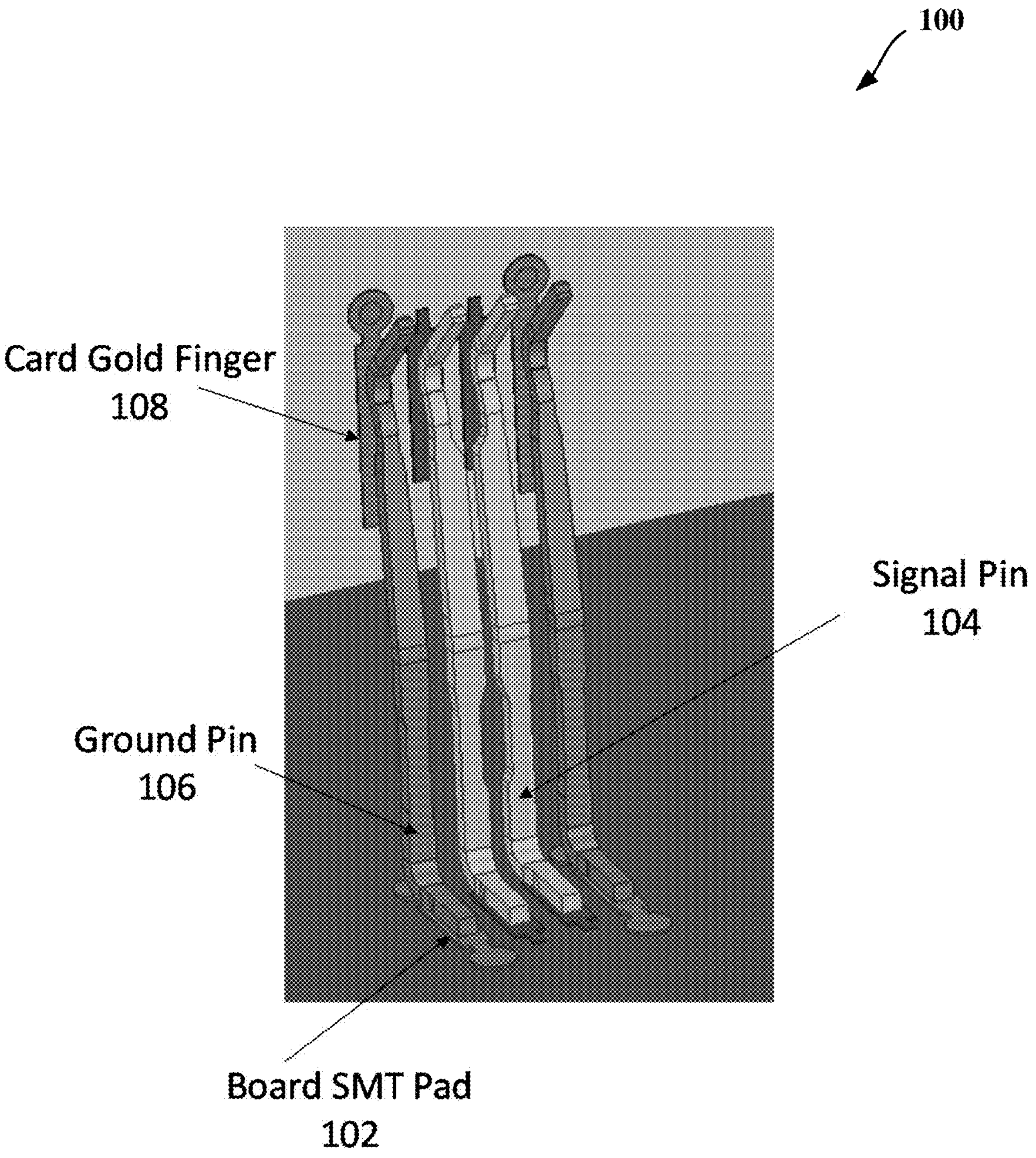
FIG. 1A illustrates a sample card edge connector design.

FIG. 1A illustrates a sample card edge connector design 100. The connector performance will be impacted by the board side Surface Mount Technology (SMT) pad 102, signal and ground connector pins 104/106, and card side gold finger 108.

Figure 1B:
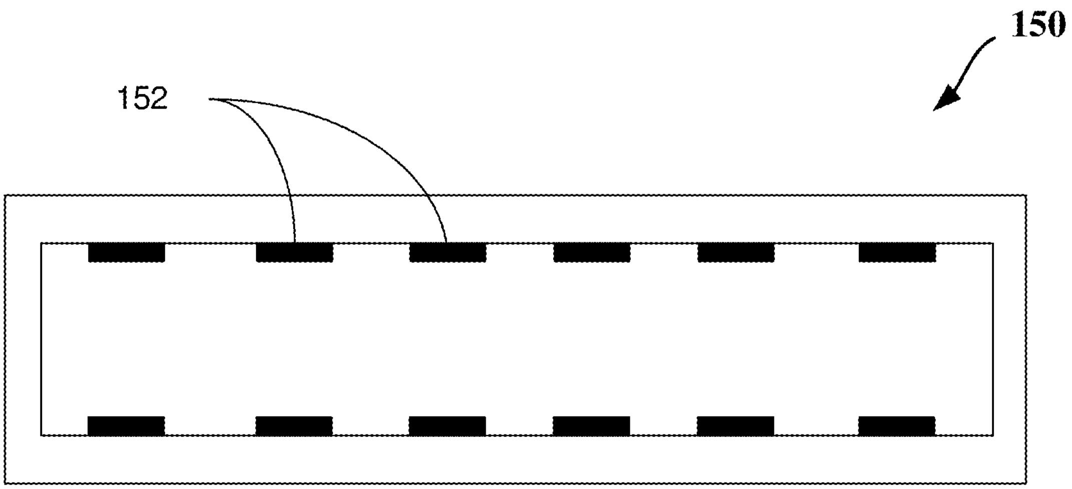
FIG. 1B illustrates a top view of a card connector, which may be used in one or more embodiments.
Figure 1C:
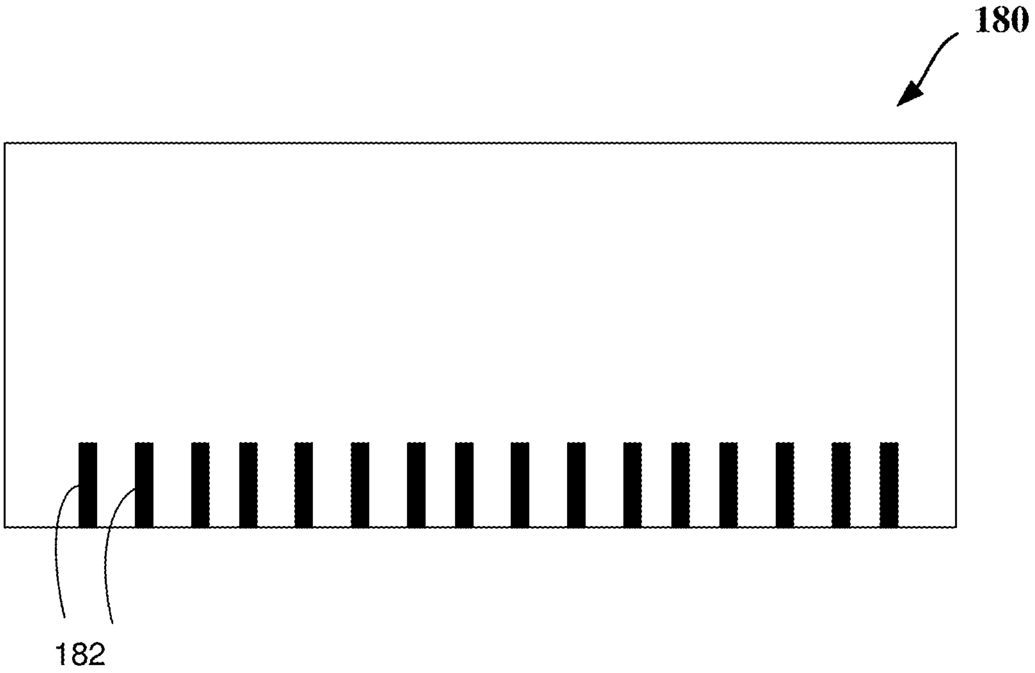
FIG. 1C illustrates a side view of a card, which may be used in some embodiments.

FIG. 1B illustrates a top view of a card connector 150 which may be used in some embodiments. FIG. 1C illustrates a side view of a card 180 which may be used in some embodiments. Generally, a connector 150 (such as a PCIe connector) is installed/mounted on a Printed Circuit Board (PCB) (which may also be referred to as a motherboard in some computing devices). The connector 150 includes pins 152 (which may include any combination of ground pin 104 and/or signal pin 106 of FIG. 1A). The card 180 (such as a PCIe card) includes gold fingers 182 (such as the card gold finger 108 or the card gold finger 202). When the card 180 is inserted into the connector 150, the card gold fingers 182 make electrical contact with the connector pins 152. Hence, the connector 150 acts as a receptacle for the card 180 to support signal propagation between the card and the PCB via the electrical contacts made between the pins 152 and gold fingers 182.

Figure 2:
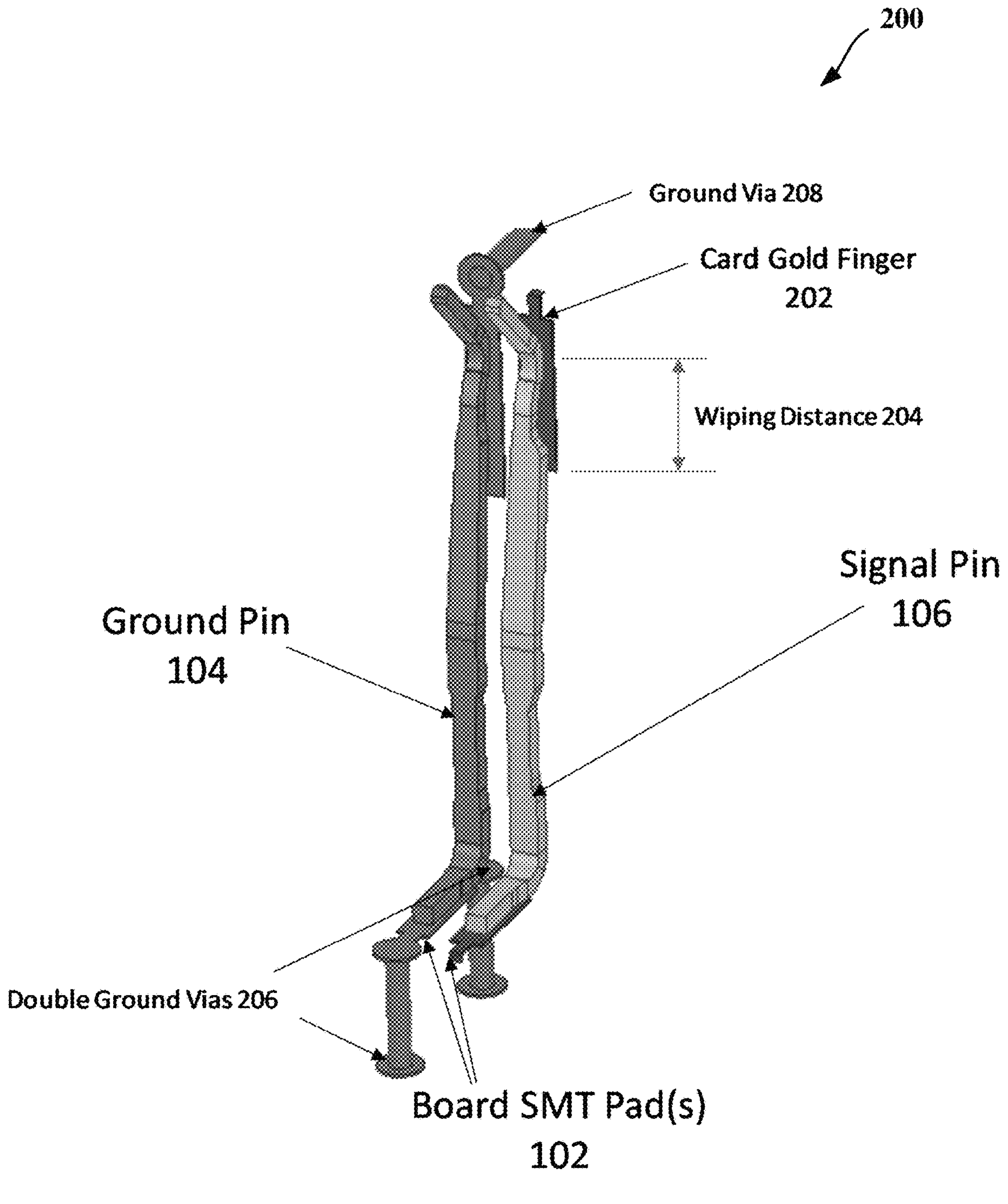
FIG. 2 illustrates a card edge connector design, according to an embodiment.

FIG. 2 illustrates a card edge connector design 200, according to an embodiment. As shown, the design include one ground pin 104, one signal pin 106, and a card gold finger 202. The card edge connector pin (e.g., signal pin 106) needs to wipe the gold finger 202 a certain distance, which is called the "wiping distance" 204 on the card gold finger 202 to remove pin surface contamination. This wiping action can ensure a sufficient electrical contact between the connector pin and the edge card being inserted in the connector. The wiping distance 204 is generally reserved for mechanical reason, but it can at least partially be an electrical stub which causes a signal degradation effect for high speed signaling.

Moreover, an electrical "stub" is generally an unnecessary/unused portion of a connector, which extends further than necessary for its intended purpose and operation discussed above (e.g., surface contamination removal). Stubs may lead to signal reflections as well as disturbances of capacity, inductivity, and/or impedance values. Such unwanted characteristics can become critical with increasing propagation speeds.

Additionally, a ground via coupling to the ground pin 104 can impact the connector pin performance. Accordingly, at least one embodiment utilizes double ground vias 206 for high-speed connectors. As shown in FIG. 2, the double ground vias 206 may be implemented on the board side, as shown in FIG. 2. On the card side, e.g., due to a tight pitch characteristics, a single ground via 208 is used since there is generally not enough space to place another ground via near the bottom edge of the card.

Some edge card designs (such as shown in FIG. 1A) reduce the wiping distance of the signal pins, shorter than the ground pin, but the wiping distance still exists which means the stub effect still exists. Also, for a ground gold finger via (such as the ground via 208 of FIG. 2), an alternative solution is to place a Via In Pad (VIP) and Plated Over (VIPPO) for the additional via near the bottom edge of a card but VIPPO increases implementation costs.

Figure 3:
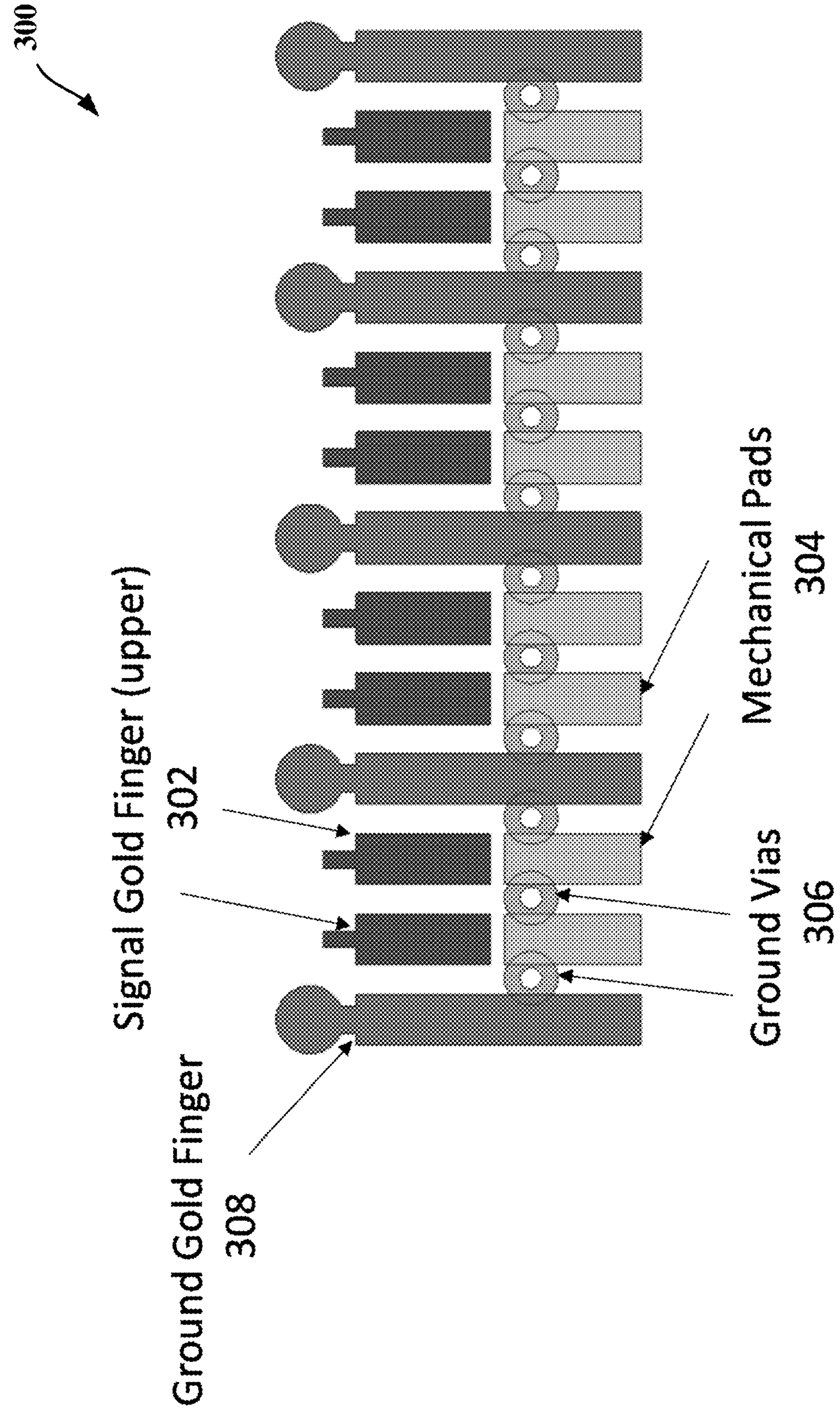
FIG. 3 illustrates a gold finger design, according to an embodiment.

FIG. 3 illustrates a gold finger design 300, according to an embodiment. As shown in FIG. 3, the signal gold finger is separated into two pieces, the upper piece 302 is an electrical pad, the lower piece 304 is a mechanical pad. While some embodiments indicate that the signal gold finger is split into two physically separate pieces, embodiments are not limited to this and the signal gold finger may be a single piece with two portions that are electrically separated/disconnected/isolated (e.g., using a non-conductive spacer, coupler, etc.).

Ground vias 306 are placed to electrically connect the ground gold finger/pad 308 and mechanical pads 304, which turns the lower section of gold fingers 304 operationally into a ground bar. Since the vias 306 are placed between two gold fingers, the connector pin will not wipe over the via holes, so there is no need to plate over the vias 306 (e.g., saving costs).

Figure 4:
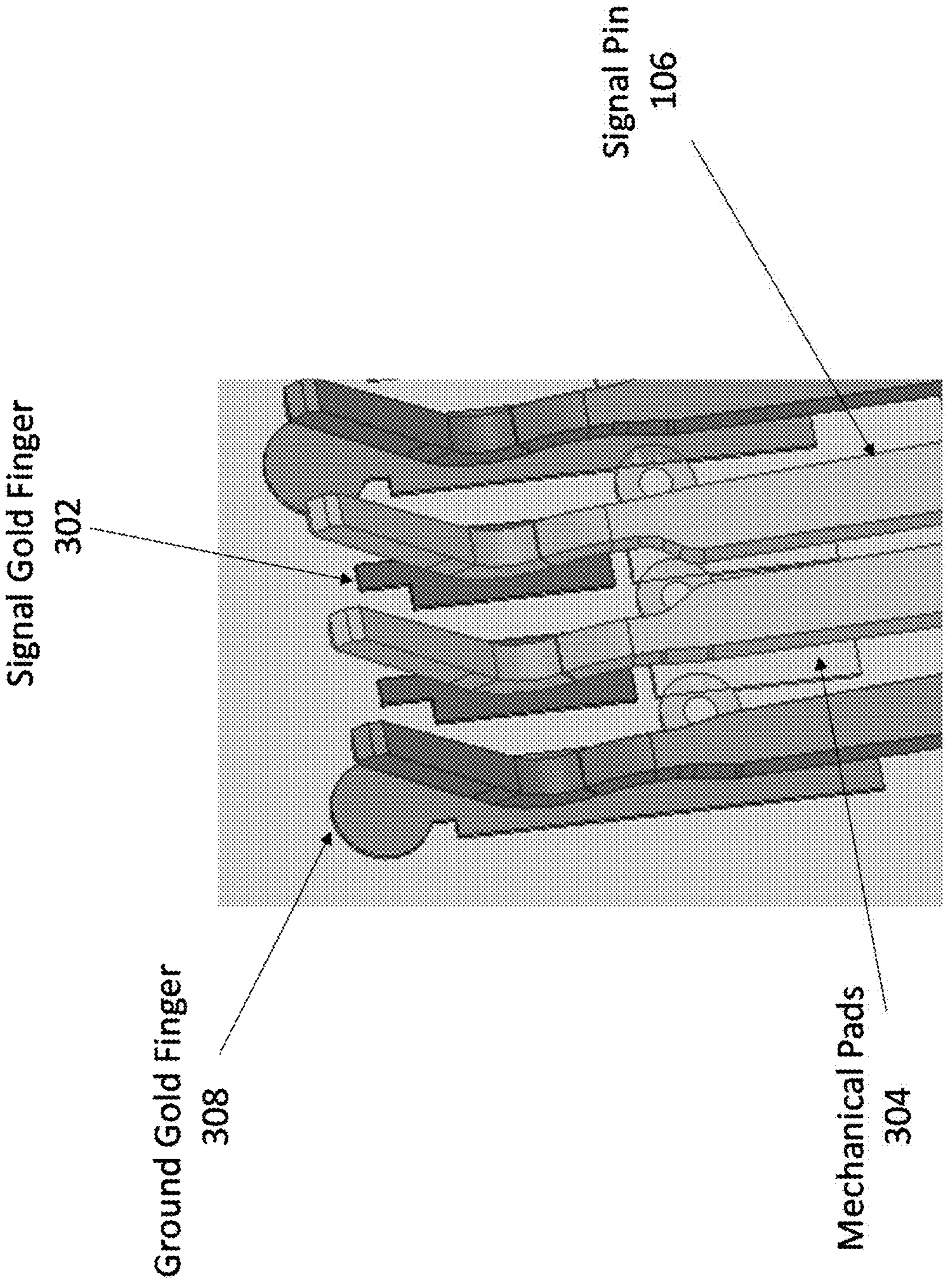
FIG. 4 illustrates a perspective view of the gold finger design of FIG. 3, according to an embodiment.

FIG. 4 illustrates a perspective view of the gold finger design of FIG. 3, according to an embodiment. Referring to FIGS. 3 and 4, as a card is inserted into the connector (from the top), the connector signal pin 106 wipes over the mechanical pad 304 first and then the signal pin 106 makes electrical contact on the electrical pad 304.

As can be seen in FIGS. 3 and 4 (e.g., due to the shorter signal gold finger 302), the electrical pad will have a much smaller stub effect. As a result, the mechanical wiping distance no longer adds a stub effect.

Accordingly, in at least one embodiment, the signal gold finger is separated/divided into two pieces, where one of the two pieces (e.g., the upper part) is used for an electrical connection, while the other piece (e.g., the lower part) is used for mechanical wiping. Additionally, a ground via may be placed between the ground pad and lower part of the signal gold finger, which in turn converts the lower part to a ground pad. Such solutions allow for a significant reduction of the stub effect. Also, a double ground via for ground gold finger (e.g., double ground vias 206 of FIG. 2) can be implemented without any significant increase in costs such as posed by VIPPO.

Figure 5:
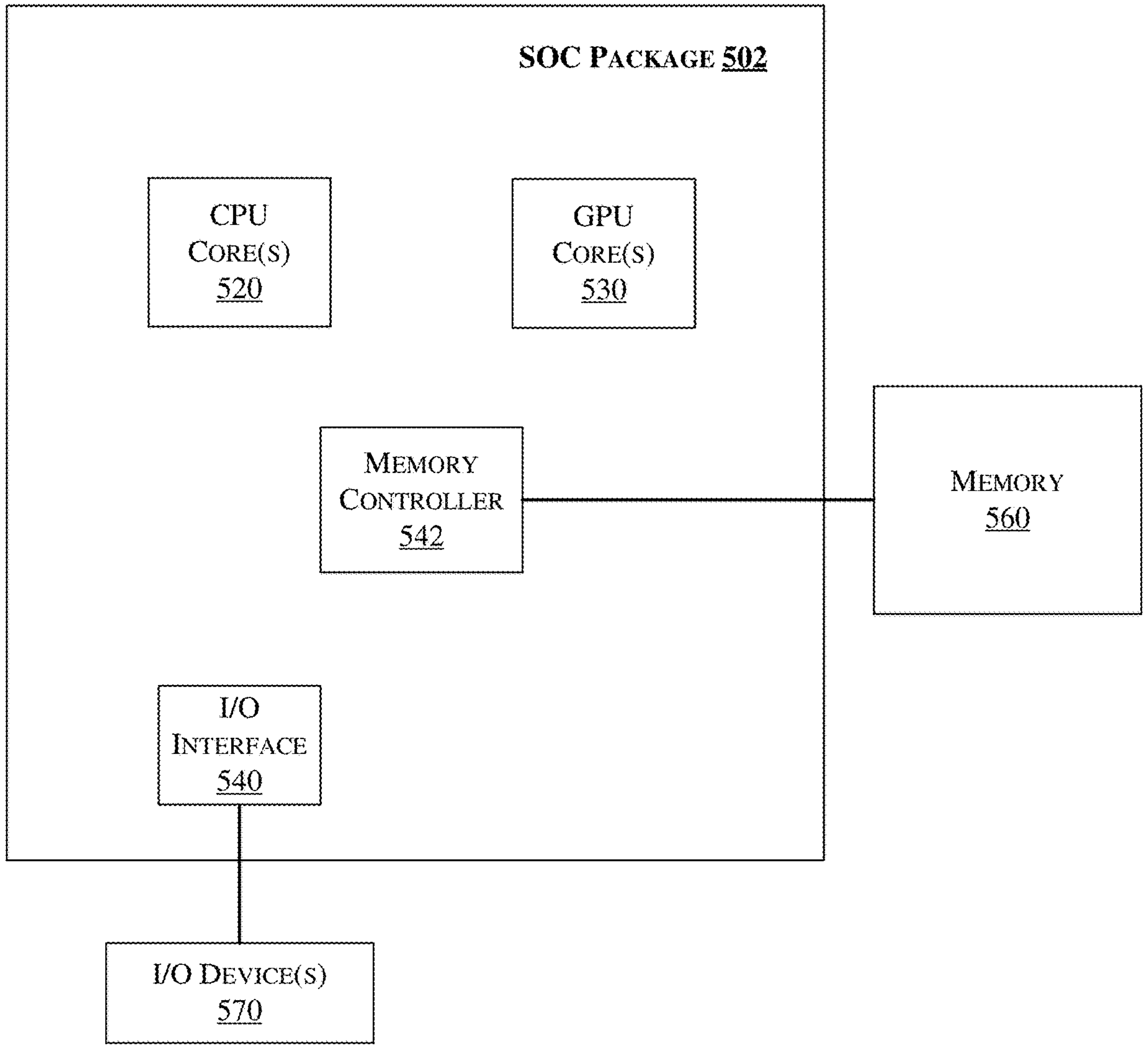
FIG. 5 illustrates a block diagram of an embodiment of a computing system, which may be utilized in various embodiments discussed herein.

One or more components discussed with reference to FIGS. 5-7 (including but not limited to I/O devices, memory/storage devices, graphics/processing cards/devices, network/bus/audio/display/graphics controllers, wireless transceivers, etc.) may be coupled using the gold finger designs discussed above. More particularly, FIG. 5 illustrates a block diagram of an SOC package in accordance with an embodiment. As illustrated in FIG. 5, SOC 502 includes one or more Central Processing Unit (CPU) cores 520, one or more Graphics Processor Unit (GPU) cores 530, an Input/Output (I/O) interface 540, and a memory controller 542. Various components of the SOC package 502 may be coupled to an interconnect or bus such as discussed herein with reference to the other figures. Also, the SOC package 502 may include more or less components, such as those discussed herein with reference to the other figures. Further, each component of the SOC package 520 may include one or more other components, e.g., as discussed with reference to the other figures herein. In one embodiment, SOC package 502 (and its components) is provided on one or more Integrated Circuit (IC) die, e.g., which are packaged into a single semiconductor device.

As illustrated in FIG. 5, SOC package 502 is coupled to a memory 560 via the memory controller 542. In an embodiment, the memory 560 (or a portion of it) can be integrated on the SOC package 502.

The I/O interface 540 may be coupled to one or more I/O devices 570, e.g., via an interconnect and/or bus such as discussed herein with reference to other figures. I/O device(s) 570 may include one or more of a keyboard, a mouse, a touchpad, a display, an image/video capture device (such as a camera or camcorder/video recorder), a touch screen, a speaker, or the like.

Figure 6:
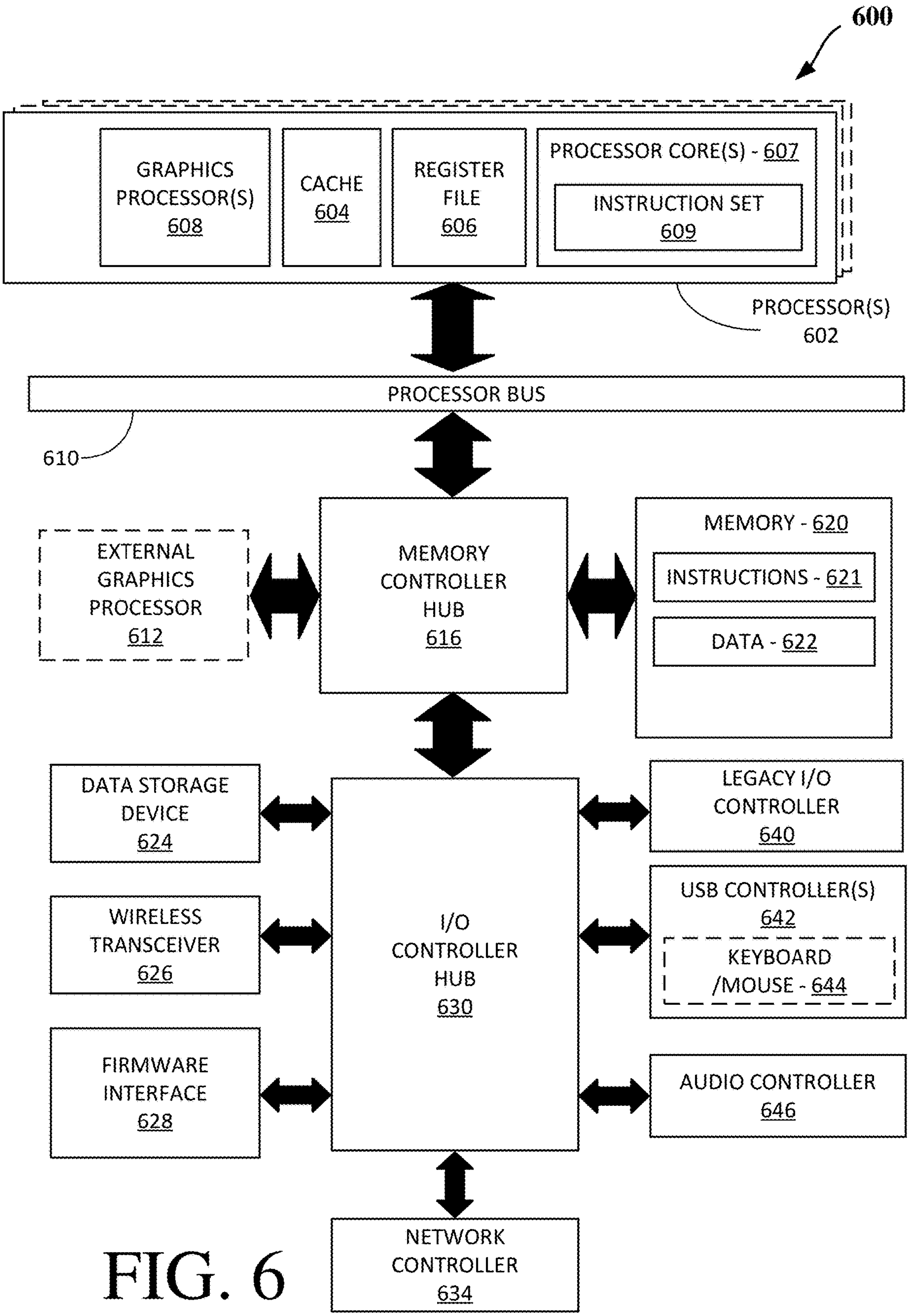
FIG. 6 illustrates a block diagram of an embodiment of a computing system, which may be utilized in various embodiments discussed herein.

FIG. 6 is a block diagram of a processing system 600, according to an embodiment. In various embodiments the system 600 includes one or more processors 602 and one or more graphics processors 608, and may be a single processor desktop system, a multiprocessor workstation system, or a server system having a large number of processors 602 or processor cores 607. In on embodiment, the system 600 is a processing platform incorporated within a system-on-a-chip (SoC or SOC) integrated circuit for use in mobile, handheld, or embedded devices.

An embodiment of system 600 can include, or be incorporated within a server-based gaming platform, a game console, including a game and media console, a mobile gaming console, a handheld game console, or an online game console. In some embodiments system 600 is a mobile phone, smart phone, tablet computing device or mobile Internet device. Data processing system 600 can also include, couple with, or be integrated within a wearable device, such as a smart watch wearable device, smart eyewear device, augmented reality device, or virtual reality device. In some embodiments, data processing system 600 is a television or set top box device having one or more processors 602 and a graphical interface generated by one or more graphics processors 608.

In some embodiments, the one or more processors 602 each include one or more processor cores 607 to process instructions which, when executed, perform operations for system and user software. In some embodiments, each of the one or more processor cores 607 is configured to process a specific instruction set 609. In some embodiments, instruction set 609 may facilitate Complex Instruction Set Computing (CISC), Reduced Instruction Set Computing (RISC), or computing via a Very Long Instruction Word (VLIW). Multiple processor cores 607 may each process a different instruction set 609, which may include instructions to facilitate the emulation of other instruction sets. Processor core 607 may also include other processing devices, such a Digital Signal Processor (DSP).

In some embodiments, the processor 602 includes cache memory 604. Depending on the architecture, the processor 602 can have a single internal cache or multiple levels of internal cache. In some embodiments, the cache memory is shared among various components of the processor 602. In some embodiments, the processor 602 also uses an external cache (e.g., a Level-3 (L3) cache or Last Level Cache (LLC)) (not shown), which may be shared among processor cores 607 using known cache coherency techniques. A register file 606 is additionally included in processor 602 which may include different types of registers for storing different types of data (e.g., integer registers, floating point registers, status registers, and an instruction pointer register). Some registers may be general-purpose registers, while other registers may be specific to the design of the processor 602.

In some embodiments, processor 602 is coupled to a processor bus 610 to transmit communication signals such as address, data, or control signals between processor 602 and other components in system 600. In one embodiment the system 600 uses an exemplary 'hub' system architecture, including a memory controller hub 616 and an Input Output (I/O) controller hub 630. A memory controller hub 616 facilitates communication between a memory device and other components of system 600, while an I/O Controller Hub (ICH) 630 provides connections to I/O devices via a local I/O bus. In one embodiment, the logic of the memory controller hub 616 is integrated within the processor.

Memory device 620 can be a dynamic random access memory (DRAM) device, a static random access memory (SRAM) device, flash memory device, phase-change memory device, or some other memory device having suitable performance to serve as process memory. In one embodiment the memory device 620 can operate as system memory for the system 600, to store data 622 and instructions 621 for use when the one or more processors 602 executes an application or process. Memory controller hub 616 also couples with an optional external graphics processor 612, which may communicate with the one or more graphics processors 608 in processors 602 to perform graphics and media operations.

In some embodiments, ICH 630 enables peripherals to connect to memory device 620 and processor 602 via a high-speed I/O bus. The I/O peripherals include, but are not limited to, an audio controller 646, a firmware interface 628, a wireless transceiver 626 (e.g., Wi-Fi, Bluetooth), a data storage device 624 (e.g., hard disk drive, flash memory, etc.), and a legacy I/O controller 640 for coupling legacy (e.g., Personal System 2 (PS/2)) devices to the system. One or more Universal Serial Bus (USB) controllers 642 connect input devices, such as keyboard and mouse 644 combinations. A network controller 634 may also couple to ICH 630. In some embodiments, a high-performance network controller (not shown) couples to processor bus 610. It will be appreciated that the system 600 shown is exemplary and not limiting, as other types of data processing systems that are differently configured may also be used. For example, the I/O controller hub 630 may be integrated within the one or more processor 602, or the memory controller hub 616 and I/O controller hub 630 may be integrated into a discreet external graphics processor, such as the external graphics processor 612.

Figure 7:
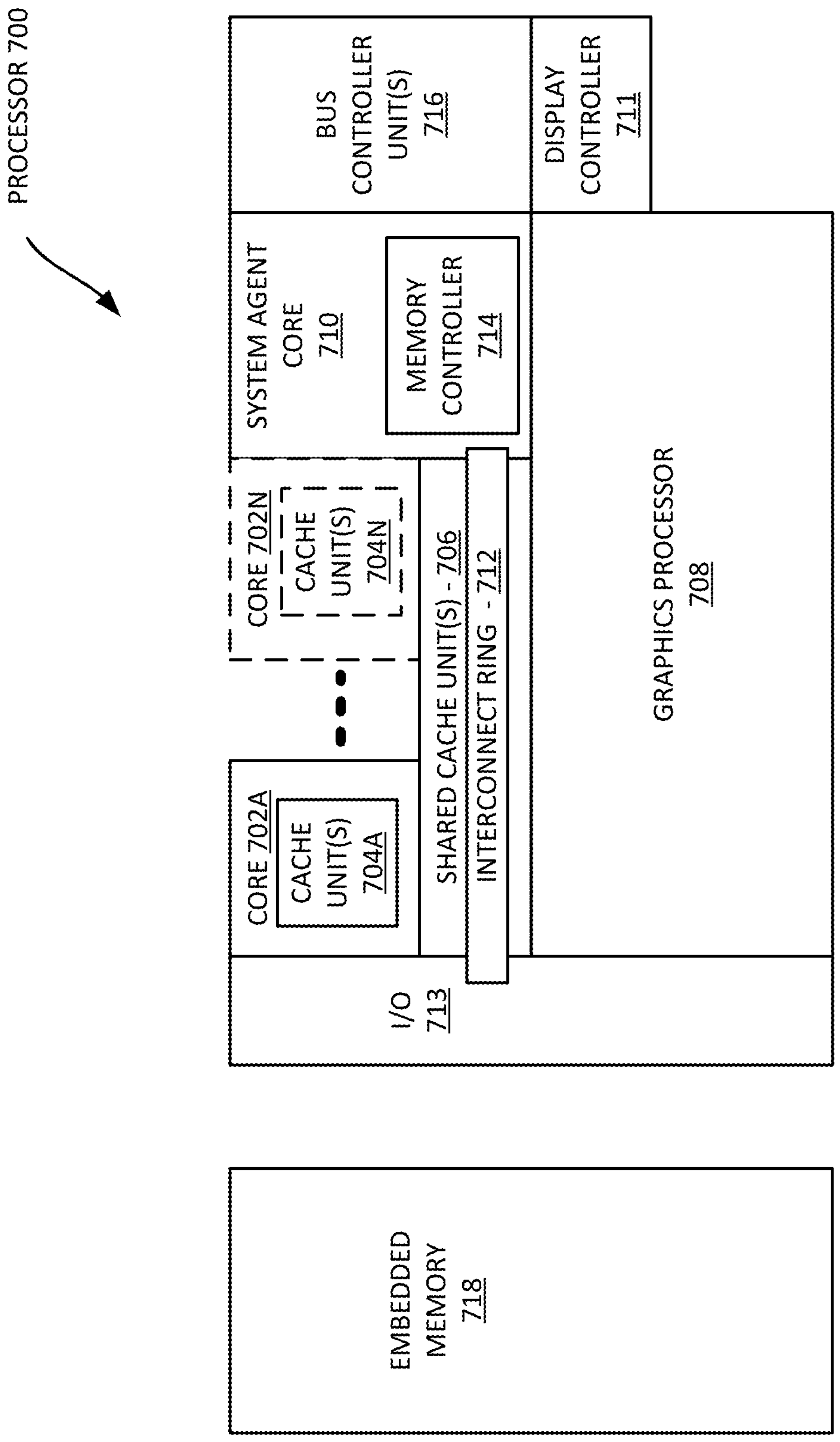
FIG. 7 illustrates various components of a processer in accordance with some embodiments.

FIG. 7 is a block diagram of an embodiment of a processor 700 having one or more processor cores 702A to 702N, an integrated memory controller 714, and an integrated graphics processor 708. Those elements of FIG. 7 having the same reference numbers (or names) as the elements of any other figure herein can operate or function in any manner similar to that described elsewhere herein, but are not limited to such. Processor 700 can include additional cores up to and including additional core 702N represented by the dashed lined boxes. Each of processor cores 702A to 702N includes one or more internal cache units 704A to 704N. In some embodiments each processor core also has access to one or more shared cached units 706.

The internal cache units 704A to 704N and shared cache units 706 represent a cache memory hierarchy within the processor 700. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 706 and 704A to 704N.

In some embodiments, processor 700 may also include a set of one or more bus controller units 716 and a system agent core 710. The one or more bus controller units 716 manage a set of peripheral buses, such as one or more Peripheral Component Interconnect buses (e.g., PCI, PCI Express). System agent core 710 provides management functionality for the various processor components. In some embodiments, system agent core 710 includes one or more integrated memory controllers 714 to manage access to various external memory devices (not shown).

In some embodiments, one or more of the processor cores 702A to 702N include support for simultaneous multi-threading. In such embodiment, the system agent core 710 includes components for coordinating and operating cores 702A to 702N during multi-threaded processing. System agent core 710 may additionally include a power control unit (PCU), which includes logic and components to regulate the power state of processor cores 702A to 702N and graphics processor 708.

In some embodiments, processor 700 additionally includes graphics processor 708 to execute graphics processing operations. In some embodiments, the graphics processor 708 couples with the set of shared cache units 706, and the system agent core 710, including the one or more integrated memory controllers 714. In some embodiments, a display controller 711 is coupled with the graphics processor 708 to drive graphics processor output to one or more coupled displays. In some embodiments, display controller 711 may be a separate module coupled with the graphics processor via at least one interconnect, or may be integrated within the graphics processor 708 or system agent core 710.

In some embodiments, a ring-based interconnect unit 712 is used to couple the internal components of the processor 700. However, an alternative interconnect unit may be used, such as a point-to-point interconnect, a switched interconnect, or other techniques, including techniques well known in the art. In some embodiments, graphics processor 708 couples with the ring interconnect 712 via an I/O link 713.

The exemplary I/O link 713 represents at least one of multiple varieties of I/O interconnects, including an on package I/O interconnect which facilitates communication between various processor components and a high-performance embedded memory module 718, such as an eDRAM (or embedded DRAM) module. In some embodiments, each of the processor cores 702 to 702N and graphics processor 708 use embedded memory modules 718 as a shared Last Level Cache.

In some embodiments, processor cores 702A to 702N are homogenous cores executing the same instruction set architecture. In another embodiment, processor cores 702A to 702N are heterogeneous in terms of instruction set architecture (ISA), where one or more of processor cores 702A to 702N execute a first instruction set, while at least one of the other cores executes a subset of the first instruction set or a different instruction set. In one embodiment processor cores 702A to 702N are heterogeneous in terms of microarchitecture, where one or more cores having a relatively higher power consumption couple with one or more power cores having a lower power consumption. Additionally, processor 700 can be implemented on one or more chips or as an SoC integrated circuit having the illustrated components, in addition to other components.

The following examples pertain to further embodiments. Example 1 includes a signal finger comprising: a first portion to communicate electrical signals between a signal pin of a card connector and a card; and a second portion to provide a mechanical wiping surface for the signal pin. Example 2 includes the signal finger of example 1, wherein the signal finger is coupled to an edge of the card. Example 3 includes the signal finger of example 1, wherein the first portion is gold plated. Example 4 includes the signal finger of example 1, wherein as the card is inserted into the card connector, the signal pin is mechanically wiped against the second portion of the signal finger to remove pin surface contamination.

Example 5 includes the signal finger of example 1, wherein as the card is inserted into the card connector, the signal pin is mechanically wiped against the second portion of the signal finger to remove pin surface contamination before the signal finger makes an electrical contact with the first portion of the signal finger. Example 6 includes the signal finger of example 1, wherein the second portion of the signal finger is electrically coupled to a ground gold finger. Example 7 includes the signal finger of example 1, wherein the second portion of the signal finger is electrically coupled to a ground gold finger through a ground via. Example 8 includes the signal finger of example 1, wherein the second portion of the signal finger is electrically coupled to a second portion of a second signal finger. Example 9 includes the signal finger of example 1, wherein the second portion of the signal finger is electrically coupled to a second portion of a second signal finger through a ground via. Example 10 includes the signal finger of example 9, wherein the second portion of the signal finger and the second portion of the second signal finger are to form a ground bar.

Example 11 includes the signal finger of example 1, wherein the second portion of the signal finger is electrically coupled to a ground finger through a first ground via, wherein the second portion of the signal finger is electrically coupled to a second portion of a second signal finger through a second ground via, wherein the ground finger, the second portion of the signal finger and the second portion of the second signal finger are to form a ground bar. Example 12 includes the signal finger of example 1, wherein the first portion and the second portion are electrically isolated. Example 13 includes the signal finger of example 1, wherein the second portion of the signal finger is electrically coupled to a ground finger through a first ground via, wherein the ground finger is coupled to ground through a plurality of ground vias. Example 14 includes the signal finger of example 1, wherein the card connector is coupled to a printed circuit board, wherein the first portion is to communicate electrical signals via the signal pin between one or more components of the card and at least one component installed on the printed circuit board.

Example 15 includes a system comprising: a motherboard having a connector to receive a signal finger; and the signal finger comprising: a first portion to communicate electrical signals between a signal pin of a card connector and a card; and a second portion to provide a mechanical wiping surface for the signal pin. Example 16 includes the system of example 15, wherein the signal finger is coupled to an edge of the card. Example 17 includes the system of example 15, wherein the first portion is gold plated. Example 18 includes the system of example 15, wherein as the card is inserted into the card connector, the signal pin is mechanically wiped against the second portion of the signal finger to remove pin surface contamination. Example 19 includes the system of example 15, wherein as the card is inserted into the card connector, the signal pin is mechanically wiped against the second portion of the signal finger to remove pin surface contamination before the signal finger makes an electrical contact with the first portion of the signal finger. Example 20 includes the system of example 15, further comprising a processor, having one or more processor cores, wherein the processor is to communicate with a device via the signal finger. Example 21 includes an apparatus comprising means to perform a method as set forth in any preceding example.

In various embodiments, the operations discussed herein, e.g., with reference to FIG. 1 et seq., may be implemented as hardware (e.g., logic circuitry or more generally circuitry or circuit), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIG. 1 et seq.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A signal finger comprising:

a first portion to communicate electrical signals between a signal pin of a card connector and a card; and a second portion to provide a mechanical wiping surface for the signal pin, wherein the second portion of the signal finger is electrically coupled to a second portion of a second signal finger.

2. The signal finger of claim 1, wherein the signal finger is coupled to an edge of the card.

3. The signal finger of claim 1, wherein the first portion is gold plated.

4. The signal finger of claim 1, wherein as the card is inserted into the card connector, the signal pin is mechanically wiped against the second portion of the signal finger to remove pin surface contamination.

5. The signal finger of claim 1, wherein as the card is inserted into the card connector, the signal pin is mechanically wiped against the second portion of the signal finger to remove pin surface contamination before the signal finger makes an electrical contact with the first portion of the signal finger.

6. The signal finger of claim 1, wherein the second portion of the signal finger is electrically coupled to a ground gold finger.

7. The signal finger of claim 1, wherein the second portion of the signal finger is electrically coupled to a ground gold finger through a ground via.

8. The signal finger of claim 1, wherein the second portion of the signal finger is electrically coupled to a second portion of a second signal finger through a ground via.

9. The signal finger of claim 8, wherein the second portion of the signal finger and the second portion of the second signal finger are to form a ground bar.

10. The signal finger of claim 1, wherein the second portion of the signal finger is electrically coupled to a ground finger through a first ground via, wherein the second portion of the signal finger is electrically coupled to a second portion of a second signal finger through a second ground via, wherein the ground finger, the second portion of the signal finger and the second portion of the second signal finger are to form a ground bar.

11. The signal finger of claim 1, wherein the second portion of the signal finger is electrically coupled to a ground finger through a first ground via, wherein the ground finger is coupled to ground through a plurality of ground vias.

12. The signal finger of claim 1, wherein the card connector is coupled to a printed circuit board, wherein the first portion is to communicate electrical signals via the signal pin between one or more components of the card and at least one component installed on the printed circuit board.

13. A system comprising:

a motherboard having a connector to receive a signal finger; and the signal finger comprising:

a first portion to communicate electrical signals between a signal pin of a card connector and a card; and a second portion to provide a mechanical wiping surface for the signal pin, wherein the first portion and the second portion are electrically isolated.

14. The system of claim 13, wherein the signal finger is coupled to an edge of the card.

15. The system of claim 13, wherein the first portion is gold plated.

16. The system of claim 13, wherein as the card is inserted into the card connector, the signal pin is mechanically wiped against the second portion of the signal finger to remove pin surface contamination.

17. The system of claim 13, wherein as the card is inserted into the card connector, the signal pin is mechanically wiped against the second portion of the signal finger to remove pin surface contamination before the signal finger makes an electrical contact with the first portion of the signal finger.

18. The system of claim 13, further comprising a processor, having one or more processor cores, wherein the processor is to communicate with a device via the signal finger.

* * * * *